United States Patent [19]

Mohn

[11] 4,456,114

[45] Jun. 26, 1984

[54] TURRET COMPRISING TURNTABLES FOR BOTTLES IN A BOTTLE-HANDLING MACHINE, AND MORE PARTICULARLY A LABELING MACHINE

[75] Inventor: Hans-Werner Mohn, Kaarst, Fed. Rep. of Germany

[73] Assignee: Jagenberg AG, Dusseldorf, Fed. Rep. of Germany

[21] Appl. No.: 331,939

[22] Filed: Dec. 17, 1981

[30] Foreign Application Priority Data

Jan. 7, 1981 [DE] Fed. Rep. of Germany ....... 3100197

[51] Int. Cl.³ ............................................ B65G 29/00

[52] U.S. Cl. .................................... 198/377; 198/478; 198/802

[58] Field of Search ............... 198/377, 478, 480, 344, 198/802, 803, 646, 653; 156/567, 571, DIG. 13, DIG. 26, DIG. 27

[56] References Cited

U.S. PATENT DOCUMENTS 931,663 8/1909 Wilbur ................................ 198/803

3,567,011 3/1971 Pinkham ............................. 198/478

3,992,855 11/1976 Palmieri et al. ...................... 198/653

4,220,237 9/1980 Mohn ................................. 156/567

4,244,462 1/1981 Kronseder ........................... 198/344

4,275,807 6/1981 Mohn et al. ......................... 198/377

*Primary Examiner*—Joseph E. Valenza

*Assistant Examiner*—Daniel Alexander

*Attorney, Agent, or Firm*—Sprung, Horn, Kramer & Woods

[57] ABSTRACT

In a bottle handling machine, a turret for transport of bottles comprising a plurality of turntables arranged in a circle and controlled by cam followers, a plane fixed cam operatively connected to the turret so that as the turret revolves the cam is contacted by the cam followers of the turntables, each follower having a lever arm guided in said cam, movement of said lever arm rotating the associated turntable back and forth, and a gear meshing therewith and joined to said lever arm, the gear joined to each lever arm being disposed between the gears of two adjacent turntables and meshing with said gears. As a result the turret can accommodate more turntables so the machine output is higher.

4 Claims, 2 Drawing Figures

TURRET COMPRISING TURNTABLES FOR BOTTLES IN A BOTTLE-HANDLING MACHINE, AND MORE PARTICULARLY A LABELING MACHINE

BACKGROUND OF THE INVENTION

The invention relates to a turret comprising a plurality of turntables, arranged in a circle and controlled by cam followers, for bottles in a bottle-handling machine, and more particularly a labeling machine, and comprising further a plane fixed cam which as the turret revolves is contacted by the cam followers of the turntables, each follower rotating the associated turntable back and forth by means of a lever arm which is guided in said cam, and more particularly is guided in said cam to drag therein, and of a gear train comprising a gear mounted on the turntable shaft and a gear meshing therewith and joined to said lever arm.

In a prior-art turret of this type, each turntable is associated with a transmission of its own disposed between the individual turntables and comprising a gear and a lever arm. Now such a transmission indirectly has the effect of lowering the production rate since the lever arm of each turntable needs considerable room to move, with the result that the turret will not accommodate as many turntables as might be desirable.

SUMMARY OF THE INVENTION

The object of the invention is to provide a turret which permits the production rate of the bottle-handling machine to be increased.

In accordance with the invention, this object is accomplished in that the gear joined to the lever arm is in each case disposed between the gears of two adjacent turntables and is in mesh therewith.

With such a turret, both the mechanical drive requirements and the necessary space are reduced, with the result that more turntables can be accommodated on the turret than before. And since more space is available for the lever arm than would otherwise be the case, the lever arm can be made longer. Because of the speed reduction at the pivot axis, this means less play; and because of the speed increase at the free end of the lever arm, it means less strain on the cam and on the cam follower.

Since the lever-arm gear is located between the gears of two adjacent turntables and meshes directly with them, both turntables will rotate in the same direction as the lever arm is pivoted. While with the approach in accordance with the invention the two turntables can no longer be controlled individually, this is not a factor since in view of the multiplicity of turntables on the turret the difference would be small.

In accordance with one feature of the invention, a particularly compact turret that is easily serviced and readily changed over is characterized in that the two turntables which are rotated by the same gear are mounted, along with that gear and its lever arm, in a cup-shaped housing block, and that the turret is provided with a receptacle into which the housing block can be plugged and in which it is held in an angular position determined by stops, catches or the like. With a turret so designed, a variety of bottle sizes or shapes can be handled simply by changing the cup-shaped housing block. It is possible to change the speed ratio and to modify the cam or portions thereof.

BRIEF DESCRIPTION OF THE DRAWINGS

The invention will now be described in greater detail with reference to an embodiment illustrated in the accompanying drawing, wherein.

DETAILED DESCRIPTION OF THE INVENTION

Figure 1:
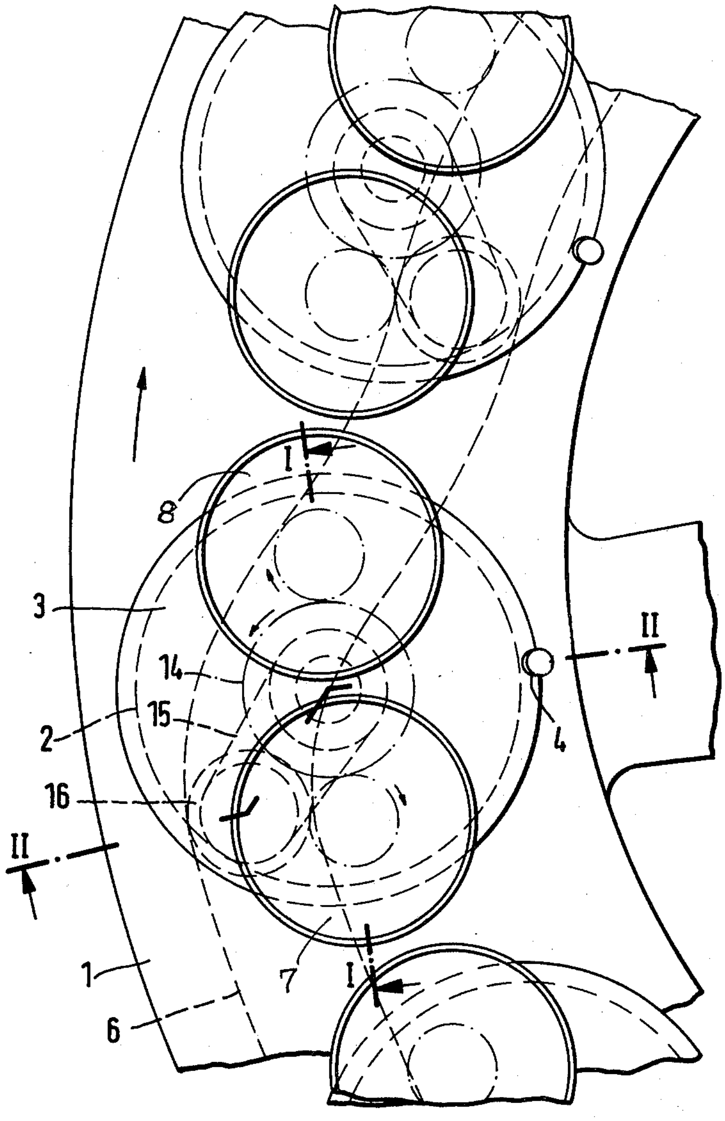
FIG. 1 is a fragmentary top plan view of a turret.
Figure 2:
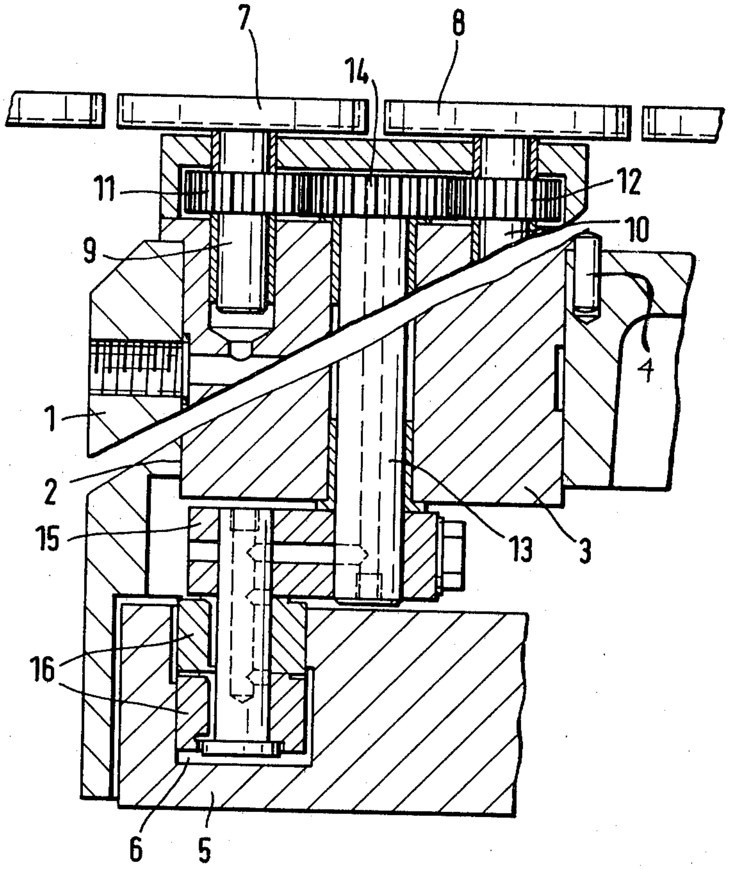
FIG. 2 is an axial section, the top portion being taken along the line I—I and the bottom portion along the line II—II of FIG. 2.

The turret 1 shown in the drawing is rotated by a drive which is not shown. In the upper portion and marginal region it is provided with receptacles 2 which are arranged in a circle and in which identical housing blocks 3 are inserted, secured against rotation by a detent 4. Disposed below the upper portion of the turret 1 is a plate 5 comprising a fixed grooved cam 6.

Two turntables 7 and 8 are mounted with their drive shafts 9 and 10 in the housing block 3 in a row in the direction of rotation of the turret 1. A gear 11 or 12, respectively, is keyed to the drive shaft 9 or 10, respectively. The two gears 11 and 12 mesh with gear 14 which by its shaft 13 is mounted between them, also in the housing block 3. The drive shaft 13 projects from the bottom of the housing block 3 and is joined to a lever arm 15 which at its free end carries a pair of cam-follower rollers 16 which engage the grooved cam 6.

As the turret 1 revolves, the lever arm 15, guided to drag in the grooved cam 6, oscillates back and forth. This oscillating mouth is converted into a unidirectional rotary motion of the turntables 7 and 8 in the housing block 3.

As is apparent especially from FIG. 1, the turntables 7 and 8 are disposed in close proximity to each other to permit a maximum number of them to be accommodated on the turret. Since the drive necessary for rotation of a turntable requires a step-up gear transmission formed of two gears 11 and 14 and a lever arm guided to drag, the space required therefor corresponds approximately to the diameter of a housing block 3, as may be seen from FIG. 1. If such a drive were associated with each turntable, it would not be possible to accommodate so many turntables on the turret. But since in accordance with the invention an additional turntable can be associated with the same housing block 3 without extra space having to be provided for its drive, it becomes possible to space the turntable closely, which in turn permits the production rate to be increased. The considerable noise generated at high production rates can be reduced by insulating the turret from the machine housing by interposing damping members between them. The noise can be further reduced by providing the cam-follower rollers 16 with a sound-absorbing plastic inset.

It will be appreciated that the instant specification and claims are set forth by way of illustration and not of limitation, and that various changes and modifications may be made without departing from the spirit and scope of the present invention.

What is claimed is:

1. In a bottle handling machine, a turret for transport of bottles comprising a plurality of cam-follower controlled turntables arranged in a circle and driven by first gears, a plane fixed cam operatively connected to the turret so that as the turret revolves the cam is contacted by the cam followers of the turntables, each follower having a lever arm guided in said cam, movement of each lever arm rotating the associated turntables back and forth, and a second gear meshing with each associated turntable and joined to said lever arm, the second gear joined to each lever arm being disposed between the first gears to two adjacent turntables and meshing with said first gears.

2. A turret according to claim 1, wherein the two turntables rotated by the same second gear are mounted, along with said second gear and its lever arm, in a cup-shaped housing block, the turret being provided with receptacles for the housing block into which the block can be plugged.

3. A turret according to claim 2, including a stop for holding each block in a given angular position within its receptacle.

4. A turret according to claim 2, including a means for holding each block in a given angular position within its receptacle.

* * * * *